(12) United States Patent
Kim

(10) Patent No.: US 11,593,770 B2
(45) Date of Patent: Feb. 28, 2023

(54) SYSTEM FOR TRANSMITTING PAYMENT INFORMATION USING MOBILE TERMINAL AND METHOD THEREOF

(71) Applicant: Allink Co., Ltd., Seoul (KR)

(72) Inventor: Kyung Dong Kim, Seongnam-si (KR)

(73) Assignee: Allink Co., Ltd., Seoul (KR)

( * ) Notice: Subject to any disclaimer, the term of this patent is extended or adjusted under 35 U.S.C. 154(b) by 0 days.

(21) Appl. No.: 17/696,884

(22) Filed: Mar. 17, 2022

(65) Prior Publication Data
US 2022/0207498 A1 Jun. 30, 2022

Related U.S. Application Data

(63) Continuation of application No. 16/953,357, filed on Nov. 20, 2020, now Pat. No. 11,282,044.

(30) Foreign Application Priority Data

Feb. 19, 2020 (KR) .................. 10-2020-0020635

(51) Int. Cl.
*G06Q 20/02* (2012.01)
*G06Q 20/08* (2012.01)
(Continued)

(52) U.S. Cl.
CPC ........... *G06Q 20/02* (2013.01); *G06Q 20/085* (2013.01); *G06Q 20/202* (2013.01);
(Continued)

(58) Field of Classification Search
CPC .... G06Q 20/02; G06Q 20/085; G06Q 20/202; G06Q 20/322; G06Q 20/385; G06Q 20/3276; G06Q 20/3278; G06Q 20/204; G06Q 20/3263; G06Q 20/3274; G06Q 20/401; G06Q 20/327; G06Q 20/326; G06Q 20/3255; G06Q 20/352; G06Q 20/4014; G06Q 20/14; G06K 7/10297;
(Continued)

(56) References Cited

U.S. PATENT DOCUMENTS 9,195,984 B1  11/2015 Spector et al.
9,311,659 B2  4/2016 Fisher
(Continued)

FOREIGN PATENT DOCUMENTS

| KR | 10-2014-0071607 A | 6/2014 |
|---|---|---|
| KR | 10-2015-0109635 A | 10/2015 |
| KR | 10-2015-0138868 A | 12/2015 |
| KR | 10-2016-0133302 A | 11/2016 |
| KR | 10-2017-0022303 A | 3/2017 |
| KR | 10-2017-0099340 A | 8/2017 |
| KR | 10-2017-0134162 A | 12/2017 |
| RU | 2617548 C2 | 4/2017 |

OTHER PUBLICATIONS

Naver blog. Oct. 29, 2015. Geum Economist. AppCard? You Can Even Pay with Only a Cell Phone???, Retrieved from: <URL: https://m.blog.naver.com/PostVies.nhn?blogId=fss2009&logNo=220521228970&proxyReferer=https:%2F%2Fwww.google.com%2F>, pp. 1-9.

*Primary Examiner* — A. Hunter Wilder
(74) *Attorney, Agent, or Firm* — Park, Kim & Suh, LLC

(57) ABSTRACT

In order to process a mobile transaction offline, a user terminal transmits a mobile transaction code and a merchant terminal ID to a payment information transmission server and the payment information transmission server transmits a payment information message including the mobile transaction code to a merchant terminal, so that it is possible to process mobile transactions through a unified user interface despite different payment plans of various payment service providers.

8 Claims, 6 Drawing Sheets

(51) Int. Cl.
*G06Q 20/32* (2012.01)
*G06Q 20/20* (2012.01)
*G06Q 20/38* (2012.01)
*G06K 19/07* (2006.01)
*G06K 7/10* (2006.01)
*G06K 19/06* (2006.01)
*H04W 88/02* (2009.01)

(52) U.S. Cl.
CPC ......... *G06Q 20/322* (2013.01); *G06Q 20/385* (2013.01); *G06K 7/10297* (2013.01); *G06K 19/06037* (2013.01); *G06K 19/0723* (2013.01); *G06Q 20/3276* (2013.01); *G06Q 20/3278* (2013.01); *H04W 88/02* (2013.01)

(58) Field of Classification Search
CPC ........ G06K 19/06037; G06K 19/0723; H04W 88/02; G07G 1/06; G07G 1/14; H04L 67/146
See application file for complete search history.

(56) References Cited

U.S. PATENT DOCUMENTS

| | | |
|---|---|---|
| 10,311,428 B2 | 6/2019 | Bush et al. |
| 10,990,947 B2 | 4/2021 | Rizvi et al. |
| 2012/0078789 A1 | 3/2012 | Harell |
| 2013/0246259 A1 | 9/2013 | Dessert |

SYSTEM FOR TRANSMITTING PAYMENT INFORMATION USING MOBILE TERMINAL AND METHOD THEREOF

CROSS-REFERENCE TO RELATED APPLICATIONS

This application is a continuation of U.S. patent application Ser. No. 16/953,357, filed on Nov. 20, 2020, currently pending, which claims the priority of Korean Patent Application No. 10-2020-0020635 filed on Feb. 19, 2020, in the Korean Intellectual Property Office, the disclosure of which is incorporated herein by reference.

BACKGROUND OF THE INVENTION

Field of the Invention

The present invention relates to a system for transmitting payment information using a mobile terminal and a method thereof, and more particularly, to a system for transmitting payment information and a method thereof capable of efficiently transmitting payment information despite a plurality of smartphone payment service applications provided by various payment service providers.

Description of the Related Art

Recently, personal communication terminals such as smartphones have been widely distributed. The personal communication terminals such as smartphones have been developed to perform not only a function of a telephone for communicating with the other party, but also functions of Internet access, multimedia viewing, and mobile payment.

In particular, as the smartphones provide a payment function for mobile transactions, the demand for more convenient and safe mobile payments has increased.

Accordingly, various payment service providers not only provide a payment means in online shopping malls, but also launch even into a payment business at offline stores using smartphones, and as a result, various payment plans have appeared for each payment service provider.

Particularly, as the number of offline payment service providers using smartphones increases, types of payment plans also increase, and thus, many problems occur.

In other words, in order to perform the mobile payment using smartphones offline, payment information stored in the smartphone needs to be transmitted to a merchant terminal such as point of sales (POS), but payment software programs and/or interface devices for transmitting the payment information stored in the smartphone to the POS are not unified, and thus, each payment service provider transmits the payment information using its own interface device and/or payment software program. For example, some payment service providers provide its own NFC readers to read the payment information from the smartphones, while some payment service providers provide a magnetic secure transmission (MST) method to use a conventional magnetic card infrastructure as it is. In addition, some payment service providers provide a method of reading a QR code displayed on a user's smartphone with a reader, and other payment service providers provide a method of reading a barcode displayed on the user's smartphone, and some payment service providers also use these methods in combination.

As such, as each payment service provider independently establishes an interface to communicate with a smartphone, confusion and inconvenience of users are increased, and that becomes a major obstacle to the growth of the mobile payment market using the smartphones.

Furthermore, even in the terms of merchants, there is a problem in that whenever a new payment service provider comes up, a new payment software program on the POS system needs to be installed and clerks working at a merchant's workplace need to be educated to process each payment plan.

Accordingly, a unified interface method is needed with which a personal mobile terminal, such as a smartphone, is able to transmit the payment information to a merchant's POS system despite of various payment service providers.

SUMMARY OF THE INVENTION

An object of the present invention is to provide a system and a method for transmitting payment information from a user's mobile terminal to a merchant terminal commonly used by various payment service providers. According to the present invention to solve the technical objects, a payment information transmission server receives a mobile transaction code, a merchant terminal ID and a payment service provider ID.

The payment information transmission server transmits a payment information message including an instruction and the mobile transaction code to the merchant terminal, wherein, the instruction is generated referring to the merchant terminal ID.

Further, a software agent on the merchant terminal receives the instruction and the mobile transaction code from the payment information transmission server, and executes the instruction in order for a payment software program on the merchant terminal to transmit the transaction code to an authentication server despite different types of the payment software programs.

Further, according to the present invention to solve the technical objects, a system for transmitting payment information using a mobile terminal includes a merchant terminal ID provider, an user's mobile terminal configured to transmit a payment request message including merchant terminal ID acquired from the merchant terminal ID provider and a mobile transaction code, a payment information transmission server configured to generate a payment information message for transmitting the mobile transaction code received from the user's mobile terminal to a merchant terminal corresponding to the merchant terminal ID, and the merchant terminal configured to transmit the mobile transaction code received from the payment information transmission server to a payment authentication server.

According to the present invention, in an offline payment plan using a user's mobile terminal, despite the payment plans of various payment service providers, it is possible to process mobile transactions through a unified payment system.

By making it possible to use a user interface and a payment process provided by each conventional payment service provider as it is, it is possible to increase convenience of payment service providers and users participating in the market.

It is possible to process offline mobile transactions using a user's mobile terminal without providing an additional reader or scanner at an offline store.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
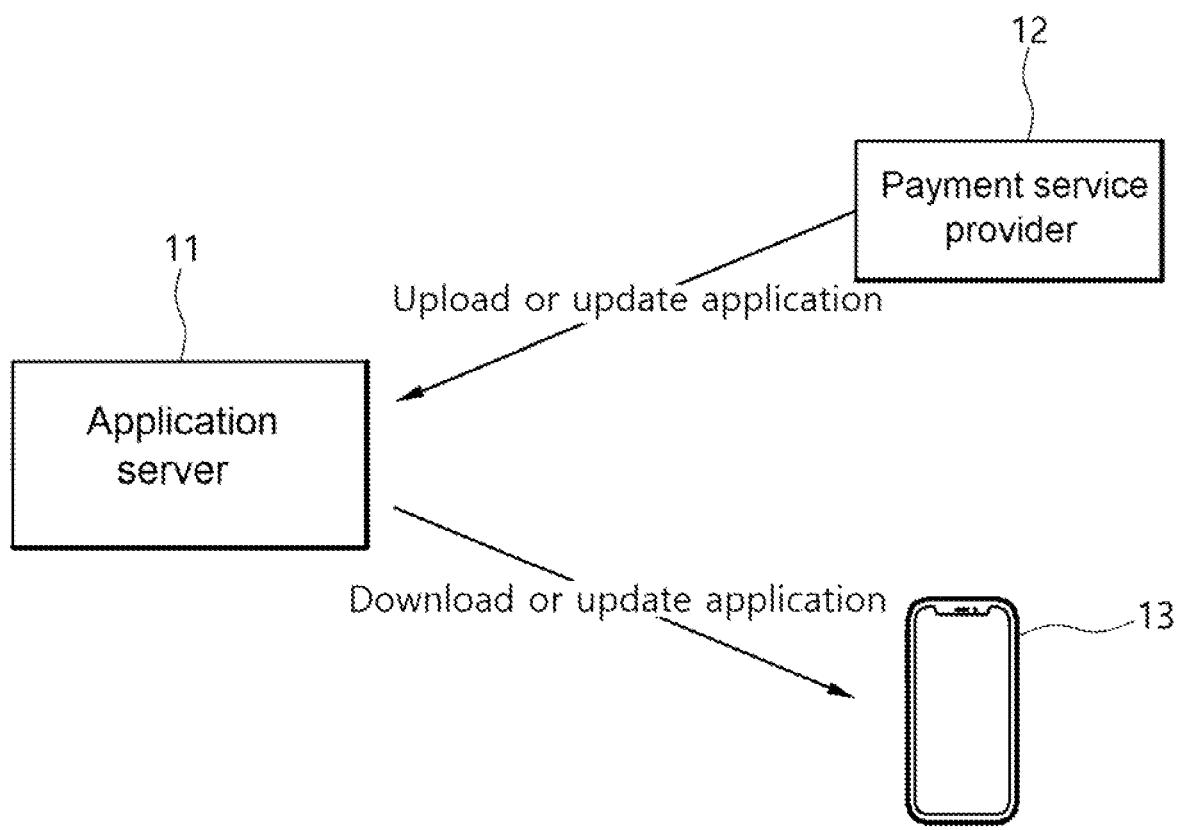
FIG. 1 illustrates a process of downloading a payment service application according to an embodiment of the present invention.

FIG. 1 illustrates a process of downloading a mobile payment service application according to an embodiment of the present invention.

As illustrated in FIG. 1, a payment service provider 12 develops a payment service application having a payment service function and uploads the payment service application to an application server 11. The payment service application has a payment service provider ID and an execution file for generating and transmitting a payment request message including a merchant terminal ID, a payment service provider ID and a transaction code.

Meanwhile, if the payment service application has already been uploaded to the application server 11, the payment service provider 12 can access the application server 11 to update the payment service application. The updated payment service application also has payment service provider ID and an execution file for generating and transmitting a payment request message including a merchant terminal ID, a payment service provider ID and a transaction code. The execution file may be configured in a library format in the smartphone application.

A user may download and install the payment service application having the payment service provider ID and the execution file by accessing the application server 11 through the user's smartphone.

Alternatively, if the payment service application is already installed in the user's smartphone, the user may update the payment service application so that the payment service application has the payment service provider ID and the execution file.

Figure 2:
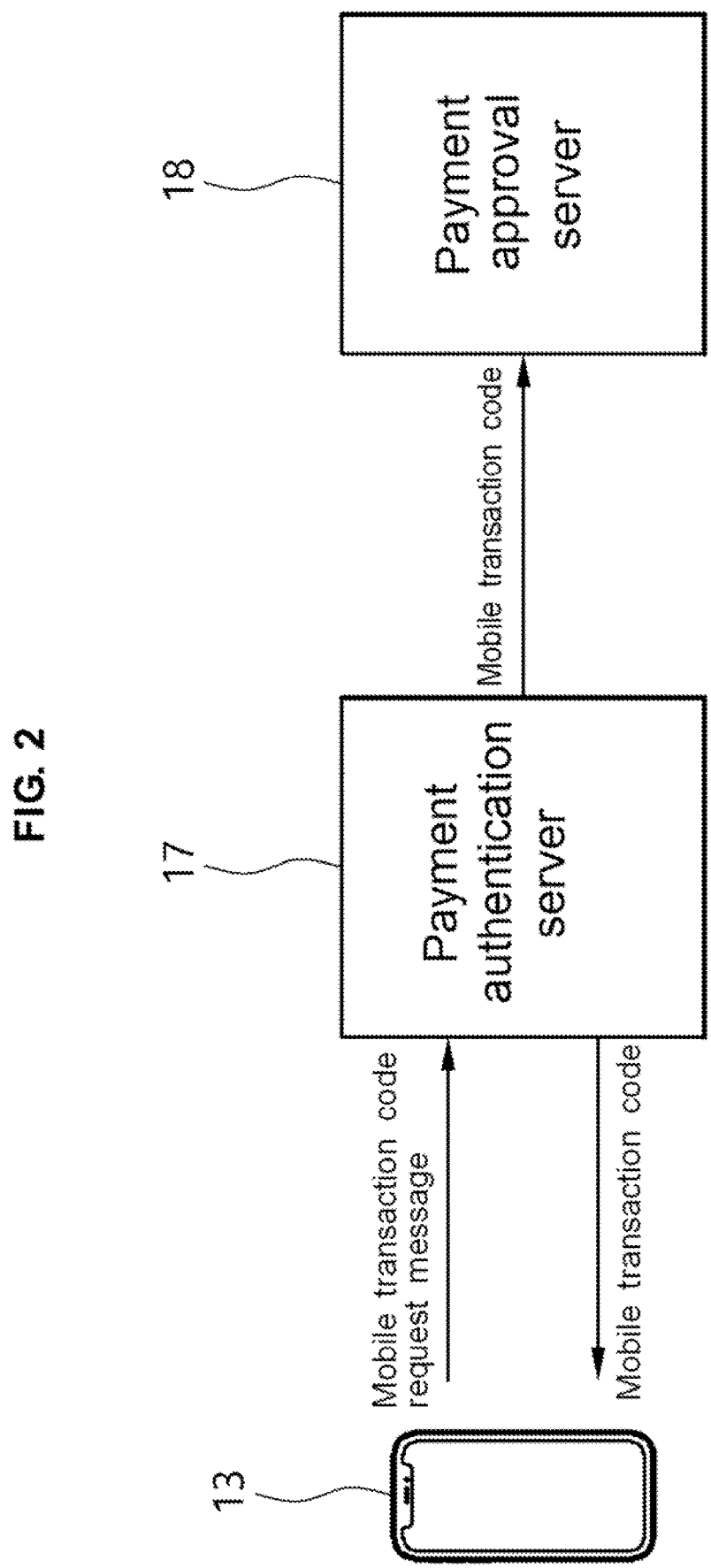
FIG. 2 illustrates a process of acquiring a mobile transaction code according to an embodiment of the present invention.

FIG. 2 illustrates a process of acquiring a mobile transaction code according to an embodiment of the present invention. As illustrated in FIG. 2, when a user runs a payment service application on a smartphone 13 and performs smartphone user authentication, the user's smartphone 13 transmits to a payment authentication server 17 a mobile transaction code request message including a card ID and user authentication information.

In a process of registering an actual credit card through the payment service application, a card ID has already been generated corresponding to a user's actual credit card number.

Therefore, the generated card ID is stored in the smartphone payment service application and the payment authentication server 17.

The payment authentication server 17 authenticates whether the user's smartphone 13 which has requested a transaction code is legitimate by using the authentication information transmitted from the user's smartphone 13, and checks whether the card ID received from the user's smartphone 13 matches a card ID previously generated during the credit card registration.

When the user authentication and the checking of the card ID are completed, the payment authentication server 17 generates and stores a transaction code corresponding to the card ID received from the user's smartphone 13. In addition, the transaction code generated by the payment authentication server 17 is transmitted to the user's smartphone 13.

The payment authentication server 17 checks whether the transaction code transmitted to the user's smartphone 13 matches the transaction code received from a merchant terminal 16. When the matching is confirmed, the payment authentication server 17 may transmit the actual credit card number corresponding to the received transaction code to a payment approval server 18.

As an example, the transaction code may be generated by changing only the remaining 10 digits while leaving 6 digits as it is from the actual credit card number consisting of 16 digits. The generated transaction code is stored in the payment authentication server 17, and the generated transaction code corresponds to the actual credit card number and the card ID. Since the transaction code may be generated and stored for each transaction in correspondence with the actual credit card number and the card ID, the payment authentication server 17 may store a plurality of transaction codes corresponding to one actual credit card number and one card ID, and in case that the transaction is canceled, a transaction corresponding to the transaction code is processed to be canceled.

Meanwhile, the transaction code may also be generated by adding a specific identification code which indicates "transaction code" to the 16-digit actual credit card number.

Table 1 illustrates how actual credit card number corresponds to card ID and transaction code(s) which are stored in the payment authentication server 17.

TABLE 1

| User 1 | Actual credit card number #1 | Card ID #1 | Mobile Transaction code #1 |
| | | | Mobile Transaction code #2 |
| | | | Mobile Transaction code #3 |
| | | | Mobile Transaction code #4 |
| | Actual credit card number #2 | Card ID #2 | Mobile Transaction code #1 |
| | | | Mobile Transaction code #2 |
| User 2 | Actual credit card number #1 | Card ID #1 | Mobile Transaction code #1 |
| | | | Mobile Transaction code #2 |

The user may register a user's credit card for a mobile transaction on the payment authentication server 17 using the payment service application. When the user registers a user's own credit card on the payment authentication server 17 using the payment service application of the smartphone 13, as illustrated in Table 1, a card ID corresponding to the actual credit card number may be generated and stored.

In addition, as illustrated in Table 1, since the user may use a plurality of credit cards, a plurality of credit cards numbers may be registered for one user, and since the transaction code may be generated for each transaction, a plurality of transaction codes corresponding to one actual credit card number may be generated and stored.

Figure 3:
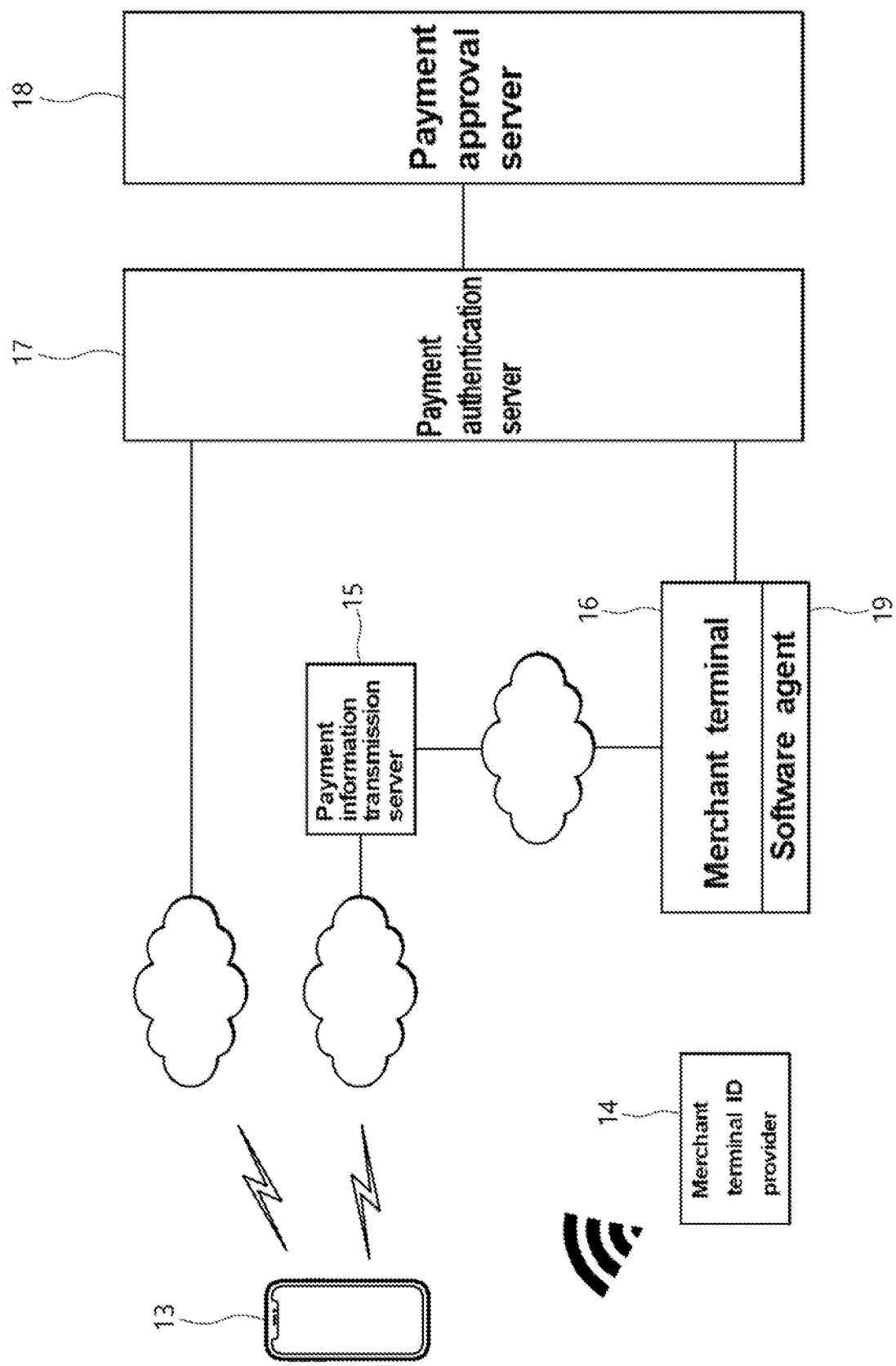
FIG. 3 illustrates a payment service system according to an embodiment of the present invention.

FIG. 3 illustrates a payment service system according to an embodiment of the present invention. As illustrated in FIG. 3, the payment system includes a merchant terminal ID provider 14, a user's smartphone 13, a payment information transmission server 15, a merchant terminal 16, a payment authentication server 17, and a payment approval server 18. The merchant terminal ID provider 14 stores an identifier to identify the merchant terminal 16, and it provides the merchant terminal ID to the user' smartphone 13.

In general, the merchant terminal 16 may be a point of sale (POS) system installed in an offline store. The merchant terminal ID provider 14 may be a plastic pad or a paper pad on which a barcode or a QR code is printed, which has the merchant terminal ID. It also may be a pad-type or sticker-type NFC tag which may provide a merchant terminal ID by near field communication (NFC). Furthermore, the merchant terminal ID provider 14 may be an electrical device which is able to generate and provide a merchant terminal ID. Various methods of providing the merchant terminal ID through communication with a user's mobile terminal such as a smartphone, such as scanning or reading may be applied, but the merchant terminal ID provider is preferably an NFC tag for convenience of use.

The merchant terminal ID provider 14 stores the merchant terminal ID for identifying the merchant terminal 16 and then performs a function of providing the stored merchant terminal ID to the user's smartphone 13, but does not transmit any information to the merchant terminal 16 directly, and thus, the merchant terminal ID provider 14 does not need to be connected to the merchant terminal 16 in a wired or wireless manner.

When the user completes the user authentication by running the payment service application installed on the user's own smartphone 13 for payment, a mobile transaction code is generated in the authentication server 17 by request of user's smartphone 13, and the transaction code is transmitted from the payment authentication server 17 to the user's smartphone 13.

The user's smartphone acquires the merchant terminal ID from the merchant terminal ID provider. For example, if the merchant terminal ID provider 14 is the NFC type, the user may acquire the merchant terminal ID by tagging the user's own smartphone 13 into the merchant terminal ID provider 14.

The payment service application run on the user's smartphone 13 transmits to the payment information transmission server 15 a payment request message which includes the mobile transaction code through a wireless network. In addition, the payment request message may further include the merchant terminal ID and the payment service provider ID.

The wireless network may also be a cellular network or a Wi-Fi network, or may also be other networks that the smartphone 13 may access wirelessly.

When the payment information transmission server 15 receives the payment service provider ID, the payment information transmission server 15 generates a payment information message. The payment information message includes the mobile transaction code received from the user's smartphone 13. In addition, the payment information message may further include an instruction which should be executed by a software agent 19 installed on the merchant terminal 16.

Herein, the software agent 19 is a software program installed on the merchant terminal 16 in order for a payment software program on the merchant terminal 16 to transmit the mobile transaction code to the payment authentication server 17 by performing the instruction included in the payment information message.

In general, a plurality of payment software programs may be installed in the merchant terminal 16, because each payment service provider installs its own payment software program on the merchant terminal 16 in order for the merchant terminal 16 to receive and transmit mobile transaction code.

Therefore, each payment service provider depends on its own software program installed on the merchant terminal 16, and which causes different procedures according to the various payment software programs.

However, the software agent 19 installed on the merchant terminal 16 of the present invention operates to transmit the mobile transaction code according to the instruction included in the payment information message received from the payment information transmission server 15, and since the instruction in the payment information message is generated by reflecting a process of the payment software, the transaction code may be accurately transmitted despite of various kinds of payment software programs.

For example, even when user interfaces (UIs) provided on the merchant terminal 16 are different from each other according to various payment service providers, the payment information transmission server 15 generates an instruction referring to service provider ID so that the transaction code is transmitted according to a UI of the payment service provider. Thereby the payment information is adaptively generated according to a payment service provider and transmitted.

When the payment information transmission server 15 recognizes that the payment service provider is "service provider A" based on the payment service provider ID, the payment information transmission server 15 may generate an instruction that instructs the software agent 19 on the merchant terminal 16 to pop up a payment window of "service provider A" by running the payment software program of "service provider A" and to insert the mobile transaction code to an input position of the pop-up window.

Alternatively, when the payment information transmission server 15 recognizes that the payment service provider is "service provider B" based on the payment service provider ID, the payment information transmission server 15 may generate an instruction that instructs the software agent 19 on the merchant terminal 16 to insert the mobile transaction code to an input position of a payment window of "service provider B".

The instruction may be generated adapting to the payment software of each payment service provider, and may be stored in advance in the payment information transmission server 15.

If changes occur in the merchant terminal 16 such as an addition of a new payment software program or a change of procedures for transmitting payment information, the instruction generated by the payment information transmission server 15 may be changed in order to reflect the change in the merchant terminal 16.

Table 2 illustrates an example of the instruction corresponding to the payment service provider according to the present invention.

TABLE 2

| Payment service provider ID | Instruction |
|---|---|
| Payment service provider #1 | Pop up payment page and input mobile transaction code |
| Payment service provider #2 | Input mobile transaction code to cursor position of payment window |
| Payment service provider #3 | Pop up payment page and input mobile transaction code after moving cursor position to left end |

The payment information transmission server 15 generates a payment information message including the instruction shown in Table 2 and the mobile transaction code and transmits the generated payment information message to the merchant terminal 16. Preferably, the instruction and the mobile transaction code may be transmitted in a single payment information message. However, alternatively, the instruction and mobile transaction code may be transmitted through respective messages.

At this time, a merchant terminal to which the payment information message is to be transmitted is determined by the merchant terminal ID transmitted from the user's smartphone 13.

As described above, the software agent 19 which is pre-installed on the merchant terminal executes the instruction included in the payment information message received from the payment information transmission server 15. The Instruction such as pop-up of the user interface window corresponding to the payment service provider, the input of the mobile transaction code in a specific position of the window, and the like is performed.

The software agent 19 may be downloaded and installed by the merchant through a network to which the POS system is connected, or also installed by copying and executing a file from a storage device such as a flash memory.

The software agent 19 may function as a virtual input device so as to exhibit the same effect as pressing a specific keyboard by executing the instruction.

Since the software agent 19 is connected to the payment information transmission server 15 by a link, when an update is required, the update of the software agent 19 may be performed through a communication with the payment information transmission server 15.

Figure 4:
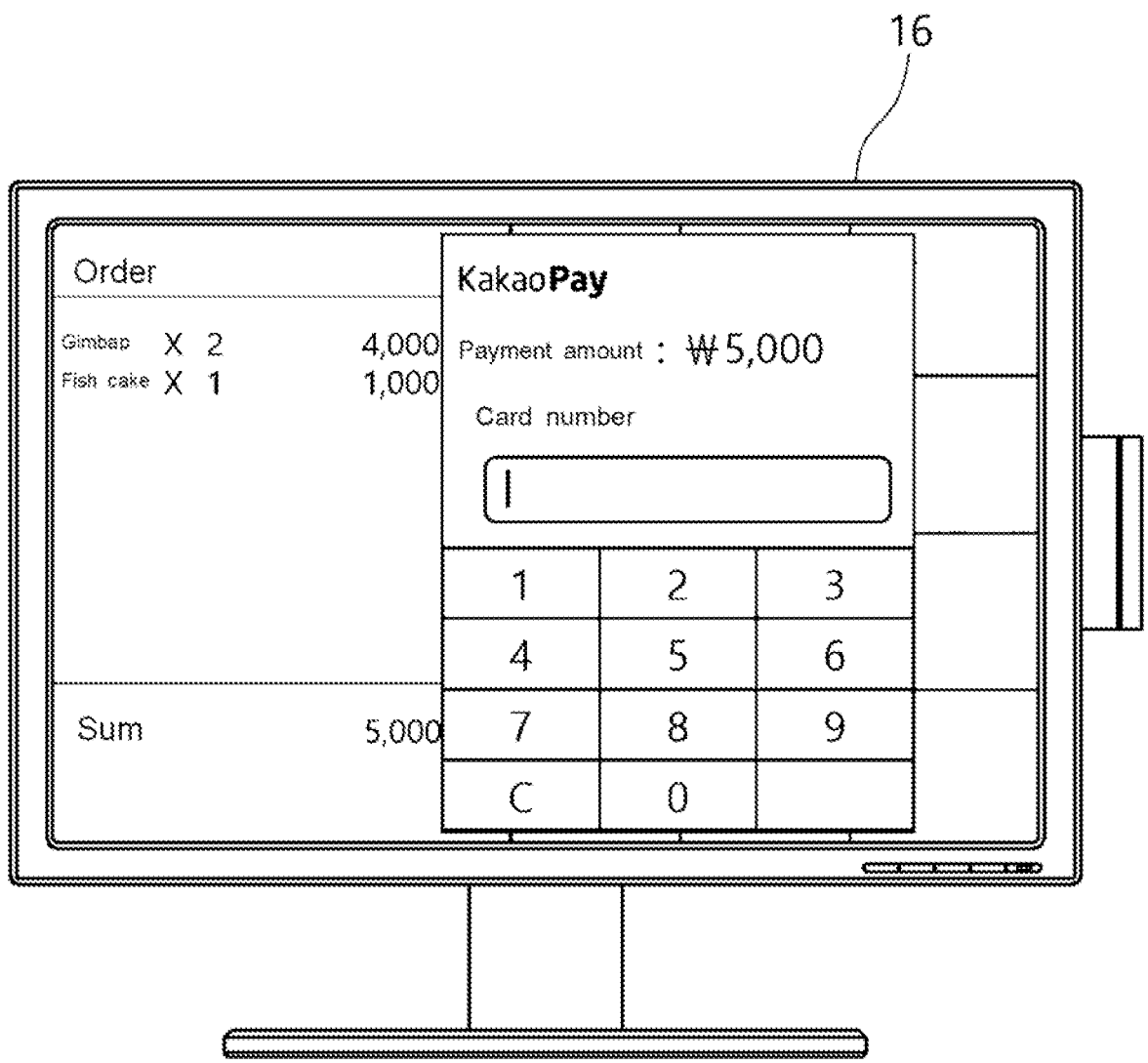
FIGS. 4 and 5 illustrate a process of executing transmission of payment information through a POS system by an agent software according to an embodiment of the present invention.
Figure 5:
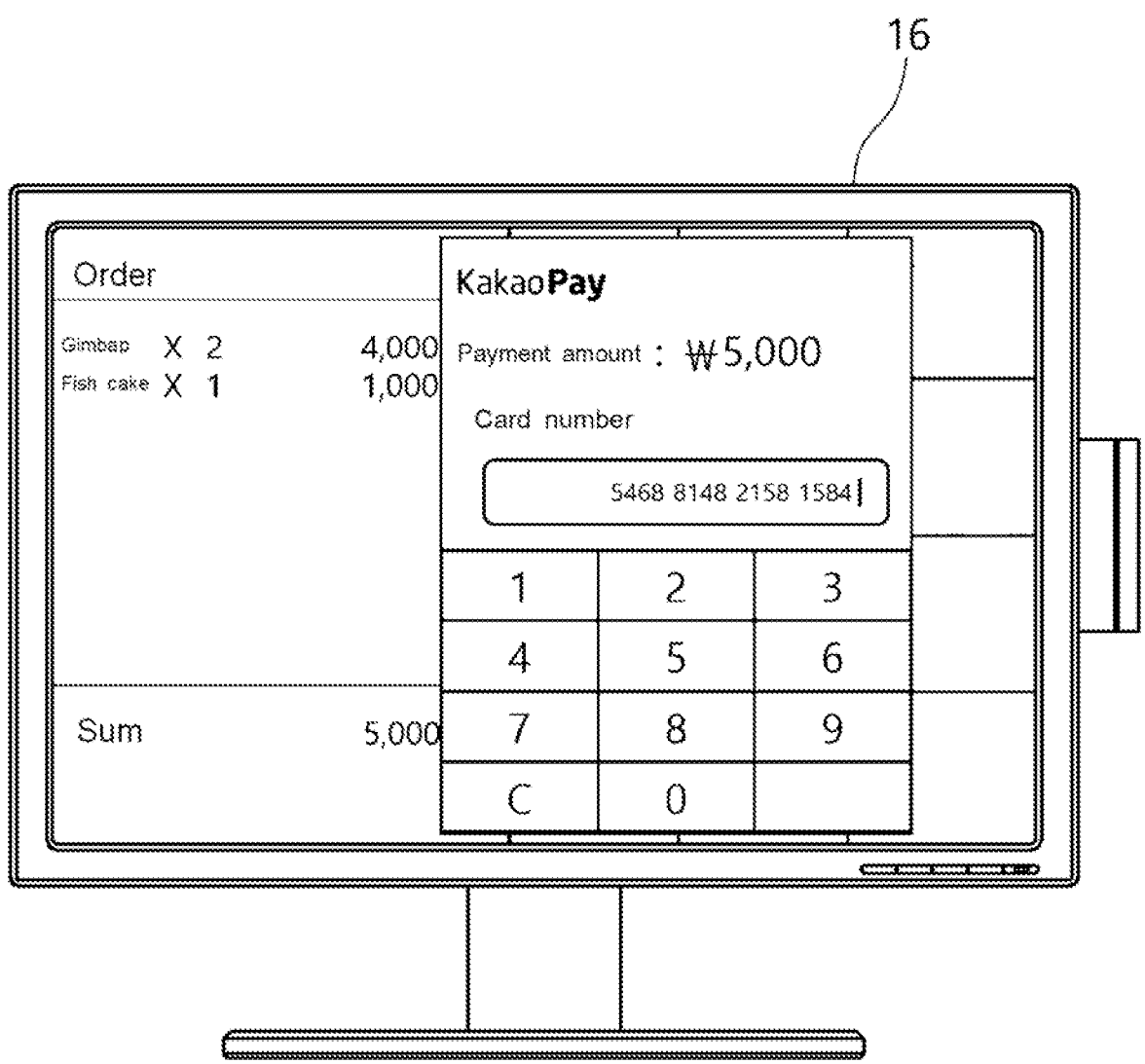

FIGS. 4 and 5 illustrate a process of transmitting payment information in a POS system by the software agent 19 according to an embodiment of the present invention.

When the merchant terminal 16 receives the payment information message from the payment information transmission server 15, as illustrated in FIG. 4, the software agent 19 activates a pop-up window corresponding to the payment service provider according to the instruction from payment information transmission server 15.

Subsequently, as illustrated in FIG. 5, the software agent 19 on the merchant terminal 16 inserts the mobile transaction code to a cursor position of the pop-up window by performing the instruction.

The merchant terminal 16 receiving the mobile transaction code transmits the mobile transaction code to the payment authentication server 17. The payment authentication server 17 checks whether the mobile transaction code transmitted from the merchant terminal 16 matches the mobile transaction code previously generated by the payment authentication server 17 and transmitted to the user's smartphone 13.

When the matching is checked, the payment authentication server 17 transmits an actual credit card number corresponding to the mobile transaction code to the payment approval server 18.

Figure 6:
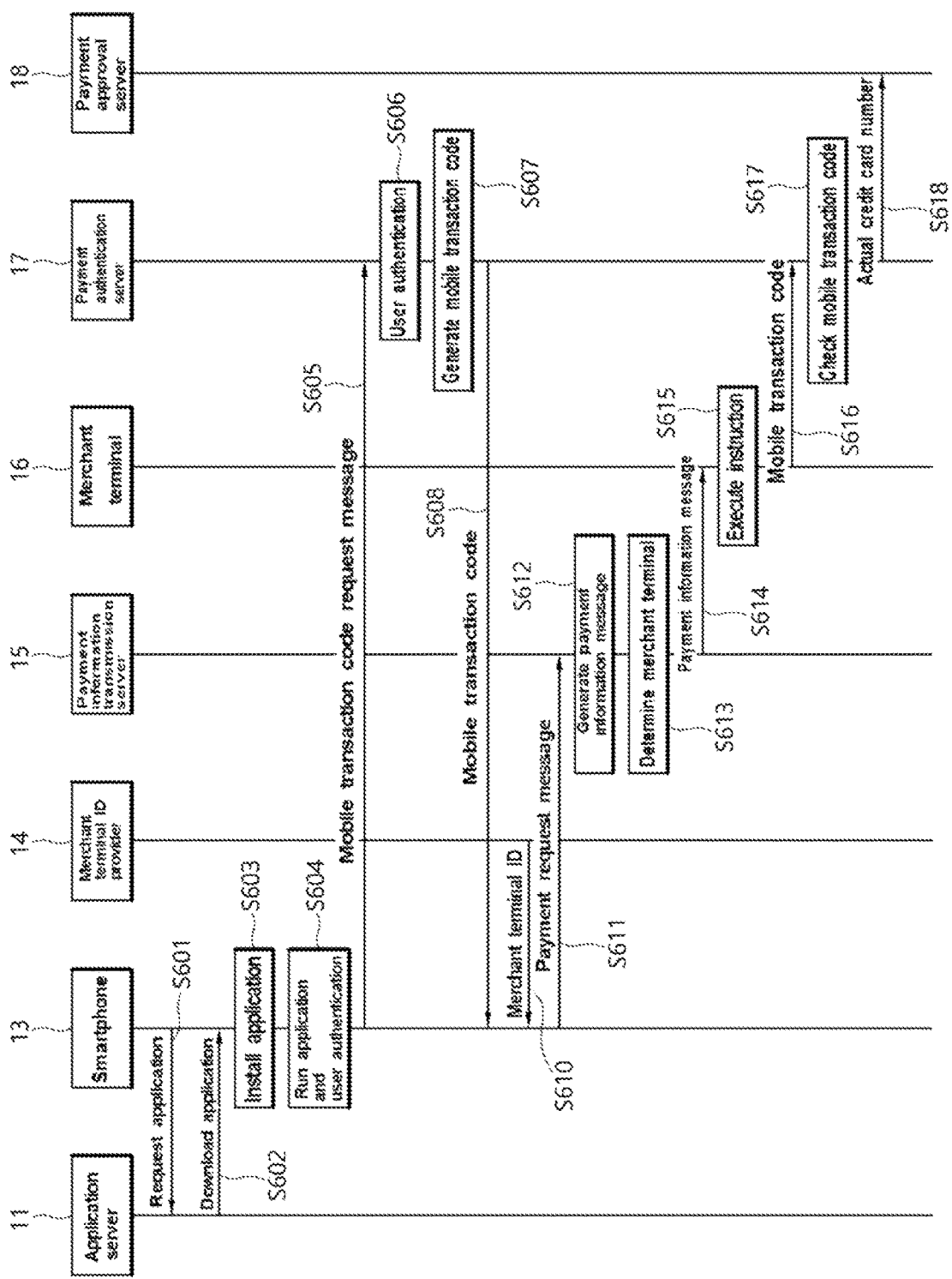
FIG. 6 is a signal processing diagram according to an embodiment of the present invention.

FIG. 6 is a signal processing diagram according to an embodiment of the present invention. Referring to FIG. 6, the user's smartphone 13 transmits an application request message to the application server 11 to download a mobile payment service application of a payment service provider (S601), downloads the requested application (S602) and installs the mobile payment service application (S603). The application includes a payment service provider ID and an execution file for transmitting a merchant terminal Identifier, a payment service provider identifier and a transaction code to the payment information transmission server 15.

When the user runs the payment service application on the user's smartphone 13, the smartphone 13 performs user authentication for a mobile payment (S604), and the payment service application on the smartphone 13 transmits a mobile transaction code request message including user authentication information and a card ID of a credit card selected by the user to the payment authentication server 17 (S605).

When the payment authentication server 17 receives the mobile transaction code request message, the payment authentication server 17 performs user authentication (S606).

After performing the user authentication, the payment authentication server 17 generates and stores a mobile transaction code corresponding to the received card ID (S607), and transmits the generated mobile transaction code to the user's smartphone 13 (S608).

When the user's smartphone 13 receives the mobile transaction code from the payment authentication server 17 (S608), the user's smartphone 13 acquires a merchant terminal ID from the merchant terminal ID provider 14 (S610).

If the merchant terminal ID provider 14 is an NFC tag, the user tags the user's smartphone 13 into the NFC tag in order for the user's smartphone 13 to acquire the merchant terminal ID.

Since the steps of receiving of the mobile transaction code (S608) and acquiring of the merchant terminal ID (S610) are mutually independent from each other, the mobile transaction code may also be received (S608) after the merchant terminal ID is acquired (S610).

When the application installed on the user's smartphone 13 executes the execution file included in the application, the application transmits a payment request message including the merchant terminal ID, the mobile transaction code, and the payment service provider ID to the payment information transmission server 15 (S611).

The merchant terminal ID, the mobile transaction code, and the payment service provider ID may be transmitted respectively, instead of being transmitted in a single payment request message.

The payment information transmission server 15 generates an instruction referring to the payment service provider ID in order for the software agent 19 to accurately deliver the mobile transaction code to a payment software program on the merchant terminal 16 (S612).

The payment information transmission server 15 determines to which merchant terminal the payment information message should be transmitted by referring to the merchant terminal ID (S613), and transmits a payment information message to a merchant terminal 16 corresponding to the merchant terminal ID (S614).

Preferably, the instruction and the mobile transaction code may be included in the payment information message. However, alternatively, the instruction and mobile transaction code may be transmitted through respective messages.

When the merchant terminal 16 receives the payment information message from the payment information transmission server 15, the software agent 19 executes the instruction, such as activating a window on the POS screen of the merchant terminal 16 corresponding to the payment service provider by controlling the payment software installed in the merchant terminal 16 and inserting the mobile transaction code to a predetermined position in the window (S615) such as a position pointed by a cursor on the POS screen of the merchant terminal 16.

The merchant terminal 16 transmits the mobile transaction code to the payment authentication server 17 (S616), and the payment authentication server 17 confirms a legitimate transaction when the mobile transaction code received from the merchant terminal 16 matches the mobile transaction code previously generated by the payment authentication server 17 and transmitted to the user's smartphone 13 (S617).

When the payment authentication server 17 confirms that it is a legitimate transaction, it transmits an actual credit card number corresponding to the mobile transaction code to the payment approval server 18.

What is claimed is:

1. A method of performing a mobile payment service, the method comprising:
   generating, by a user terminal, a mobile transaction code request message including a card ID selected by a user;
   receiving, by a payment authentication server, the mobile transaction code request message from the user terminal, and generating a mobile transaction code corresponding to the card ID;
   receiving, by the user terminal, the mobile transaction code from the payment authentication server;
   acquiring, by the user terminal, a merchant terminal ID from a merchant terminal ID provider and generating a payment request message including the merchant terminal ID, the mobile transaction code, and a payment service provider ID;
   receiving, by a payment information transmission server, the payment request message from the user terminal and generating a payment information message including the mobile transaction code and an instruction specifically assigned to the payment service provider ID in order for a software agent to accurately deliver the mobile transaction code to a payment software program;
   receiving, by a merchant terminal, the payment information message from the payment information transmission server, wherein the software agent inserts the mobile transaction code to a predetermined position in a payment window on a POS screen of the merchant terminal;
   transmitting, by the merchant terminal, the mobile transaction code to the payment authentication server.

2. The method of claim 1, wherein the predetermined position is specified by the instruction included in the payment information message.

3. The method of claim 1, wherein the payment window is displayed according to the instruction included in the payment information message.

4. The method of claim 1, wherein the merchant terminal is identified by the merchant terminal ID.

5. A system for performing a mobile payment service, the system comprising:
   a merchant terminal ID provider configured to store a merchant terminal ID;
   a user terminal configured to:
      generate a mobile transaction code request message including a card ID of selected by a user;
      receive a mobile transaction code corresponding to the card ID;
      acquire the merchant terminal ID from the merchant terminal ID provider; and
      generate a payment request message including the merchant terminal ID, the mobile transaction code, and a payment service provider ID;
   a payment authentication server configured to:
      receive the mobile transaction code request message from the user terminal;
      generate the mobile transaction code; and
      transmit the mobile transaction code to the user terminal;
   a payment information transmission server configured to:
      receive the payment request message from the user terminal; and
      generate a payment information message including the mobile transaction code and an instruction specifically assigned to the payment service provider ID in order for a software agent to accurately deliver the mobile transaction code to a payment software program; and
   a merchant terminal configured to:
      receive the payment information message from the payment information transmission server, wherein a software agent inserts the mobile transaction code to a predetermined position in a payment window on a POS screen of the merchant terminal according to the instruction; and
      transmit the mobile transaction code to the payment authentication server.

6. The system of claim 5, wherein the predetermined position is specified by the instruction included in the payment information message.

7. The system of claim 5, wherein the payment window is displayed according to the instruction included in the payment information message.

8. The system of claim 5, wherein the payment information transmission server identifies the merchant terminal using the merchant terminal ID.

* * * * *